United States Patent [19]

Kwan

[11] Patent Number: 5,922,121

[45] Date of Patent: *Jul. 13, 1999

[54] HYDROPHOBIC TREATMENT OF PIGMENTS

[75] Inventor: Wing Sum Vincent Kwan, Deerfield, Ill.

[73] Assignee: Videojet Systems International, Inc., Wood Dale, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/653,357

[22] Filed: May 24, 1996

Related U.S. Application Data

[63] Continuation-in-part of application No. 08/588,215, Jan. 18, 1996, Pat. No. 5,855,661
[60] Provisional application No. 60/004,701, Oct. 3, 1995, abandoned.

[51] Int. Cl.⁶ .................................................. C09C 3/08
[52] U.S. Cl. .................. 106/460; 106/287.13; 106/444; 106/445; 106/449; 106/471; 106/493
[58] Field of Search .................................. 106/444, 445, 106/449, 471, 493, 460, 287.13

[56] References Cited

U.S. PATENT DOCUMENTS

| | | | |
|---|---|---|---|
| 3,348,959 | 10/1967 | Csonka et al. | 106/471 |
| 3,398,113 | 8/1968 | Godshalk et al. | 524/197 |
| 3,453,130 | 7/1969 | Feld | 106/447 |
| 4,160,760 | 7/1979 | Carr et al. | 523/333 |
| 4,277,288 | 7/1981 | Lawrence et al. | 106/413 |
| 4,545,821 | 10/1985 | Rau et al. | 106/418 |
| 4,913,063 | 4/1990 | Jonas et al. | 106/413 |
| 5,420,317 | 5/1995 | Laufenberg et al. | 554/163 |
| 5,501,732 | 3/1996 | Niedenzu et al. | 106/445 |

FOREIGN PATENT DOCUMENTS

| | | |
|---|---|---|
| 0 707 051 | 4/1996 | European Pat. Off. . |
| 2 281 410 | 3/1976 | France . |
| 2673838 | 9/1992 | France . |
| 1 959 233 | 6/1970 | Germany . |
| 2 043 629 | 3/1972 | Germany . |
| 2 313 073 | 9/1974 | Germany . |
| 51-082317 | 7/1976 | Japan . |
| 59-170130 | 9/1984 | Japan . |
| 59-170131 | 9/1984 | Japan . |
| 60-079068 | 5/1985 | Japan . |
| 62-267368 | 11/1987 | Japan .................................... 106/460 |
| 6115945 | 4/1994 | Japan . |
| 6145025 | 5/1994 | Japan . |
| 07053910 | 2/1995 | Japan . |
| 07165986 | 6/1995 | Japan . |
| 8109022 | 4/1996 | Japan . |
| 1104939 | 3/1968 | United Kingdom . |
| 1 287 576 | 8/1972 | United Kingdom . |
| 1 460 315 | 1/1977 | United Kingdom . |
| 1 494 746 | 12/1977 | United Kingdom . |

OTHER PUBLICATIONS

Hyperdispersants, Schofield, J.D., Surface Coatings Institute (JOCCA), 74(6), pp. 204, 206–210, Jun. 1991.

A Model for Organic pigments in Oil or Water–Based Printing Inks, Hays, B.G., Am. Ink Maker, v. 64, pp. 13–21, Oct. 1996.

Hawley's Condensed Chemical Dictionary, 11th ed., "nonylphenol"; "lecithin", Van Nostrand, NY, pp. 694 and 838, Dec. 1987.

PCT Search Report, Dec. 10, 1996, (GB 96/02415).

*Primary Examiner*—Mark L. Bell
*Assistant Examiner*—Scott L. Hertzog
*Attorney, Agent, or Firm*—Leydig, Voit & Mayer

[57] ABSTRACT

A surface derivatizing agent is allowed to contact an aqueous slurry of transition metal-containing pigment particles to increase the hydrophobicity of the surface of such particles. The modified pigment particles disperse easily in a wide variety of organic solvents, and provide stable, dispersions having a small mean pigment particle size and narrow particle size distribution.

35 Claims, No Drawings

HYDROPHOBIC TREATMENT OF PIGMENTS

This application claims priority from the U.S. Provisional patent application Ser. No. 60/004,701, filed Oct. 3, 1995 abandoned. This application is a continuation-in-part of co-pending U.S. patent application Ser. No. 08/588,215, filed Jan. 18, 1996 now U.S. Pat. No. 5,855,661.

FIELD OF THE INVENTION

The present invention relates generally to the field of pigments. More specifically, the present invention is directed towards a method of treating pigment particles to render them hydrophobic for use in pigment dispersions that may utilize a wide variety of solvents or vehicle systems.

BACKGROUND OF THE INVENTION

Pigments that are used in inks or other nonpolar environments must be readily dispersible and must be hydrophobic. Among the most important pigments are those comprised of a transition metal or an oxide or complex thereof. Accordingly, it is important to be able to render hydrophobic the surface of such transition metal-containing pigment particles.

It is known, for example, to use surfactants to improve the dispersibility of such pigment particles, but the utility of such a process is usually limited. The use of surfactants usually does not, for example, eliminate agglomerates of the pigment particles that may already have been formed during the drying process used in the manufacture of such pigments.

Thus, a need exists for a fast and economical way to render hydrophobic the surface of transition metal-containing pigment particles, so that such particles can be easily dispersed in a wide variety of solvents or vehicle systems. Such a need is met by the method of the present invention.

BRIEF SUMMARY OF THE INVENTION

In accordance with the present invention, a surface derivatizing agent is allowed to contact an aqueous slurry of transition metal-containing pigment particles to increase the hydrophobicity of the surface of such particles.

The pigment particles thus modified by the surface derivatizing agent can then be recovered by conventional means, such as by filtration, and dried to obtain dry modified pigment particles. The modified pigment particles can then be dispersed in a wide range of solvents or vehicles, as by first adding an organic solvent or vehicle to the dry modified pigment particles to make a pigment concentrate, and then dispersing the pigment concentrate in the solvent or vehicle of choice.

The modified pigment particles disperse easily in a wide variety of organic solvents and vehicles, and provide stable, dispersions having a small mean pigment particle size and narrow particle size distribution. Typically the median particle size will be up to about 0.3 micron for most pigments. For some iron oxide pigments the median particle size may be up to about 0.7 micron.

DESCRIPTION OF THE PREFERRED EMBODIMENTS

In one general embodiment, in accordance with the present invention, there is provided a method for preparing modified pigment particles, selected from the group consisting of transition metal containing pigment particles, transition metal oxide containing pigment particles, and complexes of transition metals or transition metal oxides, said method comprising contacting an aqueous slurry of said pigment particles with a surface derivatizing agent having an α, γ-diketo moiety, a beta-hydroxy acid moiety or a hydroxamic acid moiety.

Usually, such a method of preparing modified pigment particles will comprise:

(a) preparing an aqueous slurry of pigment particles selected from the group consisting of transition metal containing pigment particles, transition metal oxide containing pigment particles, and complexes of transition metals or transition metal oxides, such that the pigment particles are present in an amount from about 1% to about 20% by weight of the slurry;

(b) adjusting the pH of the slurry;

(c) adding a surface derivatizing agent having an α, γ-diketo moiety, a beta-hydroxy acid moiety or a hydoxamic acid moiety, to the slurry in an amount less than about 10% by weight of the pigment particles;

(d) mixing the surface derivatizing agent into the slurry to obtain modified pigment particles; and (e) recovering and drying the modified pigment particles.

The resulting pigment particles may be used to prepare a pigment concentrate by adding an organic vehicle to the modified pigment particles. A pigment dispersion may be made from the concentrate by dispersing the concentrate in one or more solvents. Such solvents may include water, alcohol, aromatic solvents, aliphatic solvents, halogenated hydrocarbons, aromatic oils, aliphatic oils, glycol ethers, esters, and ketones.

The present invention thus, in one embodiment, provides a pigment dispersion, comprising:

(a) pigment particles selected from the group consisting of transition metal containing pigment particles, transition metal oxide containing pigment particles, and complexes of transition metals or transition metal oxides, (b) a surface derivatizing agent having an α, γ-diketo moiety, a beta-hydroxy acid moiety or a hydroxamic acid moiety;

(c) an organic vehicle; and (d) one or more solvents, selected from the group consisting of water, alcohol, aromatic solvents, aliphatic solvents, halogenated hydrocarbons, aromatic oils, aliphatic oils, glycol ethers, esters, and ketones.

In a specific embodiment, the present invention is directed to modified pigment particles that contain iron. Thus, in accordance with such an embodiment, there is provided a general method of preparing such modified pigment particles, selected from the group consisting of iron containing pigment particles, iron oxide containing pigment particles, and complexes of iron or iron oxides. Such a method comprises contacting an aqueous slurry of said pigment particles with a surface derivatizing agent having a phenolic group, a beta-hydroxy acid moiety, a hydroxamic acid moiety, an α, γ-diketo moiety or a phosphonic acid moiety.

In a specific embodiment, such a method comprises:

(a) preparing an aqueous slurry of pigment particles selected from the group consisting of iron containing pigment particles, iron oxide containing pigment particles, and complexes of iron or iron oxides, such that the pigment particles are present in an amount from about 1% to about 20% by weight of the slurry;

(b) optionally adjusting the pH of the slurry;

(c) adding a surface derivatizing agent having a phenolic moiety, a beta-hydroxy acid moiety, a hydroxamic acid, an $\alpha$, $\gamma$-diketo moiety or a phosphonic acid moiety to the slurry in an amount less than about 10% by weight of the pigment particles;

(d) mixing the surface derivatizing agent into the slurry to obtain modified pigment particles; and (e) recovering and drying the modified pigment particles.

The modified iron containing pigments can be used to prepare a pigment concentrate. Such a concentrate is prepared by adding an organic vehicle to the modified iron-containing pigment particles obtained in accordance with the method described above. A pigment dispersion may be prepared by dispersing such a concentrate in one or more solvents selected from the group consisting of water, alcohol, aromatic solvents, aliphatic solvents, halogenated hydrocarbons, aromatic oils, aliphatic oils, glycol ethers, esters, and ketones.

The present invention will thus provide a pigment dispersion of iron-containing pigments comprising:

(a) pigment particles selected from the group consisting of iron containing pigment particles, iron oxide containing pigment particles, and complexes of iron or iron oxides, (b) a surface derivatizing agent having a phenolic moiety, a beta-hydroxy acid moiety, a hydroxamic acid moiety, an $\alpha$, $\gamma$diketo moiety or a phosphonic acid moiety;

(c) an organic vehicle; and (d) one or more solvents, selected from the group consisting of water, alcohol, aromatic solvents, aliphatic solvents, halogenated hydrocarbons, aromatic oils, aliphatic oils, glycol ethers, esters, and ketones.

In another aspect of the present invention, there is provided a method for preparing modified pigment particles, selected from the group consisting of transition metal containing pigment particles, transition metal oxide containing pigment particles, and complexes of transition metals or transition metal oxides, wherein the method comprises contacting an aqueous slurry of said pigment particles with a surface derivatizing agent that is a trimethylsilyl donor.

In a specific embodiment, such a process comprises (a) preparing an aqueous slurry of pigment particles selected from the group consisting of transition metal containing pigment particles, transition metal oxide containing pigment particles, and complexes of transition metals or transition metal oxides, such that the pigment particles are present in an amount from about 1% to about 20% by weight of the slurry;

(b) optionally adjusting the pH of the slurry;

(c) adding a surface derivatizing agent that is a trimethylsilyl donor to the slurry in an amount less than about 10% by weight of the pigment particles;

(d) mixing the surface derivatizing agent into the slurry to obtain modified pigment particles; and (e) recovering and drying the modified pigment particles.

A pigment concentrate may be prepared by adding an organic vehicle to such modified pigment particles. A pigment dispersion may then be prepared by dispersing such a concentrate in one or more solvents selected from the group consisting of water, alcohol, aromatic solvents, aliphatic solvents, halogenated hydrocarbons, aromatic oils, aliphatic oils, glycol ethers, esters, and ketones.

The present invention thus also provides a pigment dispersion, comprising:

(a) pigment particles selected from the group consisting of transition metal containing pigment particles, transition metal oxide containing pigment particles, and complexes of transition metals or transition metal oxides, (b) a surface derivatizing agent that is a trimethylsilyl donor;

(c) an organic vehicle; and (d) one or more solvents, selected from the group consisting of water, alcohol, aromatic solvents, aliphatic solvents, halogenated hydrocarbons, aromatic oils, aliphatic oils, glycol ethers, esters, and ketones.

PIGMENTS

The pigments that are useful in the present invention are those that comprise transition metals, transition metal oxides or complexes thereof. Thus, the pigments may be pure metal, such as iron or cobalt. Alternatively, the pigments may comprise ferromagnetic powders, such as Fe-Co, Fe-Co-Ni, Fe-Co-Co-Ni, Fe-Co-B, Fe-Co-Cr-B, Mn-Bi, Mn-Al, Fe-Co-V alloys, bronze powder, and other alloys of transition metals. In some instances, for example, iron, the metal surface will consist largely of the metal oxide, under ambient conditions.

Transition metal oxides may include cubic iron oxide, acicular iron oxide, gamma-$Fe_2O_3$, and mixed crystals of gamma-$Fe_2O_3$ and $Fe_3O_4$ any of which may be doped with cobalt, barium ferrite, strontium ferrite, cuprous oxide or other oxides that are useful as pigments.

The transition metal complexes may include all formulations, or shades, of lead chromate (such as Chrome Yellow, Molybdate Orange), iron ferrocyanate complex (such as Iron Blue) and pigments of similar formulae, cobalt blue, solitan yellow and other such recognized pigment complexes.

One class of such pigments include those with the formula $X_aY_b(Z(L1)_n(L^2)_m)_c$, where X is an alkaline earth metal, Y is a transition metal or a heavy metal, Z is a transition metal or a heavy metal, L1 and L2 are ligands, which can be mono-dentate ligands, such as, for example, cyano or carbonyl moieties, or bi-dentate ligands, such as, for example, nitroso-beta-naphthol as in Pigment Green B, a equals 1 or 0, b and c are integers from 1–6, and n and m are integers from 0–6.

The pigments used in accordance with the present invention may be magnetic or nonmagnetic.

One pigment for use in the practice of the present invention is milori blue pigment. Milori blue pigment can be obtained from the Degussa Company (Ridgefield, N.J.), under the trademark MANOX BLUE, and the Pyosa Company (Mexico).

THE SURFACE DERIVATIZING AGENT

The surface derivatizing agents that may be used in the present invention may be divided into two groups, (1) chelating agents and (2) silyl compounds that react with hydroxyl groups on the surface of the pigment particles. In turn, the chelating agents that are of interest may be divided into subcategories, (i) phenol-type, (ii) diketo-type, (iii) beta-hydroxy acid-type, (iv) phosphonic acid-type and (v) hydroxamic acid-type.

The chelating agents and the silyl compounds may be used alone or in combination. Usually, from about 1 to about 10 percent, preferably from about 1 to about 5 percent, of the derivatizing agents may be used, based on the dry weight of the pigment particles. It is only necessary that the surface derivatizing agent be added in an amount effective to render the pigment particles hydrophobic. For economic reasons, smaller amounts of surface derivatizing agent are preferred.

CHELATING AGENTS

Chelating Agents—Phenol-Type

The surface derivatizing agent may be chosen from a wide range of compounds having one or more phenolic moieties, including alkylphenol compounds, substituted phenol compounds, and o-phenol alkyl(1-) ketone derivative compounds.

Alkylphenol compounds comprise a family of compounds in which an alkyl "tail" is added to phenol. Nonylphenols, such as (4-nonyl)phenol and (2,4-dinonyl)phenol are preferred among the alkylphenol compounds. These compounds have one or two nine-carbon alkyl tails, respectively. Other isomers of nonylphenol, including those having a branched tail, and including other positional isomers, may be used, as may mixtures of alkylphenol compounds or isomers. Additional alkylphenol compounds suitable for use with the methods of the present invention include, for example, compounds with shorter tails, such as pentylphenol and hexylphenol, and those with longer tails, such as decylphenol, undecylphenol, dodecylphenol, and so forth. In general, longer tails are preferred; however, nonylphenol is the preferred compound of the alkylphenol compounds, inasmuch as it is inexpensive and widely commercially available. A particularly preferred nonylphenol mixture is that available under the designation Product No. 29085-8 from Aldrich Chemical Co. Inc., Milwaukee, Wis. This product comprises a mixture of isomers of nonylphenol.

While not wishing to limit the invention to a particular theory or mode of operation, it is believed that the phenolic oxygen has a high affinity for the pigment particle, and forms a coordinated complex with the particle. The long alkyl tail creates a hydrophobic micelle around the particle, and thus effectively renders the particle hydrophobic. It is also possible that the derivatizing agent is physically absorbed onto the pigment surface.

The terms "alkyl" or "alkylated" as used in this application are intended to encompass other moieties in addition to pure alkyl chains, and include alkenyl and alkynyl chains as well as aliphatic chains, generally, that contain functional groups. It is only necessary for the aliphatic chain to render the pigment particle hydrophobic. The alkyl moiety, or an alkenyl or alkynyl analog, will typically have from about 6 to 24 carbon atoms, and more typically from about 8 to 18 carbon atoms.

Another class of phenol-type compound useful in the present invention are o-phenol alkyl(1-)ketone derivatives. As discussed above, the term "alkyl" includes other moieties in addition to pure alkyl chains. The preferred compound in this class is 2'-hydroxyacetophenone (HAP), which has the following formula:

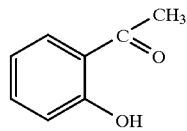

Other phenolic compounds suitable for use as surface derivatizing agents include compounds of the following general formula:

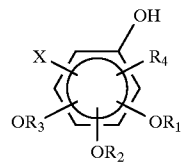

wherein $R_1$, $R_2$, and $R_3$ are the same or different and represent a straight-chain or branched-chain, alkyl, alkenyl, or alkynyl moiety of from 1–50 carbon atoms;

X is halogen; and $R_4$, is phenyl, alkenyl, alkyl, or alkynyl. Any one or more of the foregoing substituents $OR_1$, $OR_2$, $OR_3$, X, and $R_4$ may be omitted, so long as at least one of these substituents is present on the phenol ring. For example, o-methoxyphenol may be used as a surface derivatizing agent, as may p-chlorophenol. The phenyl ring and any of $R_1$–$R_4$ may include substituents that do not interfere with the function of the surface derivatizing agent, such as hydroxy, carbonyl, alkyl, alkenyl, alkynyl, alkoxy, or any other substituent that allows the compound to function as a surface derivatizing agent.

Chelating Agents—Diketo-Type

The surface derivatizing agent may be chosen from a wide range of compounds having $\alpha,\gamma$-diketo moieties, such as 1,3-diketo alkyl derivative compounds. These compounds may be defined as alkyl analogs of acetylacetic acid, which has the following formula:

$CH_3COCH_2COOH$

Useful derivatives of this compound may include alkyl acids, aldehydes, ketones, and esters. A particularly preferred 1,3-diketo alkyl compound is ethylacetoacetate, such as that available from Aldrich Chemical Co., Inc., Milwaukee, Wis. Another such preferred compound is 2,4-pentanedione.

While not wishing to limit the present invention to a particular theory or mode of operation, it is believed that the two carbonyl groups present in those compounds allow these compounds to form a chelate with pigment particles.

Chelating Agents—Beta-Hydroxy Acid Hydroxamic Acid-Type and Phosphonic Acid Type Also useful as chelating agents in accordance with the present invention are beta-hydroxy acids and hydroxamic acids which are shown respectively in the figures below:

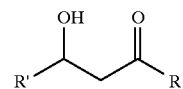

R'=alkyl, alkenyl, alkynyl, or aryl
R=alkyl, OR, OH, or H

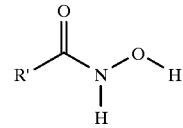

R'=alkyl, alkenyl, alkynyl, or aryl.

Both agents have a similar mode of operation to diketo compounds, in which the two oxygen atoms attach to the transition metal. Any molecule that has either beta-hydroxy acid or hydroxamic acid functionalities and has a hydrophobic part (either an alkyl or aryl type) should be useful as a chelating agent in accordance with the present invention.

As indicated, the derivatizing agent also may contain a phosphonic acid moiety. Thus, such a derivatizing agent includes phosphonic acid substituted with a hydrophobic chain. Such compounds have the formula $R(H_2PO_3)$, wherein R is an alkyl group. The alkyl group will typically have from about 6 to 24 carbon atoms, and more typically from about 8 to 18 carbon atoms.

Soy Lecithin

In some cases it is beneficial to premix the chelating agent with a lecithin, especially soy lecithin, before its application to the slurry. The preferred lecithin is Centrolex-F from Central Soya Company (Fort Wayne, Ind.). The useful amount of lecithin usually is from about 1 to about 100%, by weight of the chelating agent. Such an amount of lecithin can further improve the dispersion of the finished pigment.

To prepare the premix of lecithin and chelating agent, one typically mixes the lecithin into the chelating agent until the desired ratio of chelating agent to lecithin is obtained. Such a premix is especially useful when a combination of lecithin with nonylphenol or dinonylphenol is to be used as the derivatizing composition.

Generally, any type of lecithin may be useful in the practice of the present invention. Especially useful are lecithins or combinations of lecithins that have an HLB value of 7 or less.

For milori blue pigment, the addition of soy lecithin has a secondary effect in that it provides a green shade to the printed samples made using such. modified pigment. This green shade is important especially when the pigment is used in liquid ink for printing onto aluminum foil, as the green shade provides a favorable impression of cleanliness. It also has been found that the degree of green shading is dependent on the relative amount of soy lecithin added in the derivatizing composition used to derivatize the pigment. Thus, increasing the amount of lecithin that is used in the combination of derivatizing agent and lecithin leads to a stronger green shade in the final printed images.

SELECTION OF CHELATING AGENTS

As a general proposition, any of the aforementioned chelating agents may be used for derivatizing iron-containing pigment particles. For other transition metal pigment particles, however, only the diketo-type of chelating agents are usually employed. The hydroxy acid and hydroxamic acid type of compounds may be useful with transition metal pigments that do not contain iron, due to the similarity in their mode of complexing when compared to diketo compounds.

SILYL COMPOUNDS

As indicated, in addition to or instead of, the use of chelating agents, silyl compounds may be used to inter-react with hydroxyl groups on the surface of the pigment particles.

In targeting the surface hydroxyl groups, a trimethylsilyl (TMS) donor is used. Examples of such donors include hexamethyldisilane, hexamethyldisilazane (HMDS), bis-N,O-trimethylsilylacetamide (BSA), trimethylchlorosilane (TMCS), trimethylethoxysilane, 2-trimethylsiloxypent-2-en-4-one, trimethylsilyldimethylamine (TMSDMA), and trimethylsilylimidazole (TMSIm). The preferred TMS donor is hexamethyldisilazane, as it is lower in cost and demonstrates relative low toxicity in comparison to other TMS donors.

Other useful trialkylsilyl groups donors include those represented by the formula $R_1R_2R_3Si$—X. $R_1$ may be any carbon radical having from about one to 18 atoms. $R_2$ and $R_3$ may be a carbon chain of shorter lengths, such as from about 1 to about 8 carbon atoms. $R_1$, $R_2$ and $R_3$ may contain phenyl, alkenyl or alkynyl functionalities. X may be an alkoxyl group, a halogen or any other good leaving group. An example of such a compound is dodecyldimethylchlorosilane.

METHOD OF CONTACTING

This method comprises preparing an aqueous slurry of pigment particles, optionally adjusting the pH of the slurry, optionally heating the slurry, adding a surface derivatizing agent, stirring the solution, optionally cooling the heated solution, and recovering the pigment particles modified by the surface derivatizing agent. Typically, the surface derivatizing agent is mixed into the slurry at a temperature from about 50° C. to about 70° C.

Recovery may be by means of filtration or other suitable means. The recovered, modified pigment particles may then be washed and dried.

The aqueous slurry should contain pigment particles in an amount from about 1% up to about 20%, by weight of the slurry. Preferably, the slurry should contain from about 8% to about 12% by weight of pigment particles. If the pigment particles contain iron, then the pigment may be present in an amount from about 1% to about 50%, by weight of the slurry.

The slurry that is employed in accordance with the present invention may be that obtained in the manufacturing process for the pigment, as many of the transition metal pigments are initially produced in an aqueous environment. The desired aqueous slurry, however, can be prepared by redispersing a presscake or even dry pigment powder into water. It is preferred not to use dry pigment, if possible, as the dried pigment may already contain irreversible agglomeration.

Once the aqueous slurry is obtained, the pH of the slurry may be adjusted. It is usually preferred to adjust the pH to a range of from about 6 to 7. The exact pH to provide optimal results may vary from pigment to pigment. Preferred pH adjusting compounds include weakly basic compounds, such as sodium bicarbonate and ammonium bicarbonate.

After the pH of the slurry is optionally adjusted, the surface derivatizing agent should be added, and the resulting solution should be stirred for a time sufficient to contact the derivatizing agent with the pigment particles. Such contact occurs more quickly under the influence of heat. Therefore, it is preferred that the slurry be heated, prior to, during, or after the addition of the derivatizing agent, and that the mixture of pigment and derivatizing agent be stirred under the influence of heat. Although the temperature in this step is not critical, it should be below the temperature at which degradation of the pigment occurs. Such degradation has been observed, with respect to milori blue pigment, at temperatures over about 70° C.

Further, as stated above, as the temperature of the surface derivatizing agent/pigment solution increases, the amount of mixing time needed to contact the derivatizing agent with the pigment decreases. Thus, to minimize the amount of mixing time required, the preferred temperature range usually is from about 55° C. to about 70° C. When this temperature range is used, the time necessary to contact the derivatizing agent with the pigment particles is from about 5 minutes to about 30 minutes. The temperature and time required in any particular situation will vary depending upon the particular pigment and derivatizing agent that is used.

After the surface derivatizing agent has been added, and the solution stirred sufficiently to contact the derivatizing agent with the pigment particles, the solution, if it has been heated, may be cooled if desired, and filtered, if necessary, by conventional means, to obtain wet modified pigment particles. These wet modified particles may then be washed with water, preferably deionized water, and dried by conventional means, to obtain dry modified pigment particles. These particles then can be dispersed into a solvent system to create a pigment dispersion. Such dispersions may be prepared as described below. Of course, other means for recovering the pigment may be employed, such as sedimentation and decantation. Further, wet pigment may be otherwise treated to remove water, as by contact with organic solvents that are miscible with water, or the like.

In the case where adjustment of acidity of the pigment slurry and/or heating is impossible (as in the example of milori blue slurry), the surface derivatizing agent is still allowed to contact the pigment in the aqueous slurry form. The pigment may then be filtered, washed to remove any remaining salts, and dried, such as at 80°–100° C. It is believed that if the surface derivatizing agent comes into contact with the pigment in a cold slurry, the agent may only be physically adsorbed onto the pigment surface. Chemical bonding between the two may then occur only when the pigment is exposed to heat as in a drying oven.

FORMATION OF THE INK OR DISPERSION

The modified pigment can be mixed with an organic vehicle to obtain a pigment concentrate, which can then be dispersed in various solvent systems, to create a pigment dispersion. These pigment dispersions find uses in inks, including but not limited to solid-based, solvent based or solid material-based inks; coatings, including but not limited to paints; colorants, including but not limited to color toners, and all other applications which demand a dispersion of such pigment particles in a medium, such as the use of such a dispersion in flat-screen display devices.

Typically, the modified pigment first is mixed with an organic vehicle compatible with the solvent system in which the pigment will be dispersed, such as varnish, to form a pigment concentrate. Suitable vehicles include LV-1830, available from the Lawter Company (Northbrook, Ill.), MVFG-380, available from the Walsh Company (Newark N.J.), and Shellac R-49, available from the Mantrose-Bradshaw-Zinsser Group (Westport, Conn.). The organic vehicle preferably is added in an amount sufficient to obtain a ratio of modified pigment to vehicle of about 1:0.8 by weight or less.

The pigment concentrate can then be dispersed in various solvent systems. Although sonication of the dispersion is not necessary, it is preferred to aid dispersion of the pigment into the solvent. Useful solvent systems include aqueous systems; aromatic solvents, such as toluene and xylene; aliphatic solvents, such as hexane; halogenated hydrocarbons, such as methylene chloride and chloroform; aromatic oils, such as Tuffo 2000, an aromatic oil, available from EMCO Chemical Distributor (Chicago, Ill.); aliphatic oils, such as Magie 47 and Magie 52, both available from the Walsh Company; glycol ethers, such as propylene glycol n-propyl ether (PnP) and dipropylene glycol n-propyl ether (DpnP); esters, such as ethyl acetate; and ketones, such as methylethylketone and acetone; as well as solvent systems comprising two or more of the above solvents. The preferred solvent is toluene. If a polar solvent is desired, ethanol or an ether is preferred.

If it is desired to disperse the pigment concentrate into a polar solvent, such as isopropanol, or ethanol, toluene may be used as a co-solvent in an amount up to about 5% by volume of the dispersion. However, it has been discovered that the use of toluene as a co-solvent can be avoided if dry, modified pigment particles are mixed with a shellac, such as Shellac R-49, previously dissolved in ethanol, to give a 40% solution of Shellac R-49 by weight, to form the pigment concentrate. For this reason, if the pigment concentrate is to be dispersed in a polar solvent, it is preferred that the pigment concentrate be prepared using shellac R-49.

It has also been discovered that the dry modified pigment particles of the present invention can be used in an aqueous dispersion, if the pigment concentrate is prepared using polyvinylpyrrolidone as a vehicle. Polyvinylpyrrolidone is available under the trademark K-15, from ISP Technology, Inc. (Wayne, N.J.).

BENEFITS GAINED FROM THE PRESENT INVENTION

The modified pigments obtained in accordance with the present invention have the following advantages.

a. The surface of the pigment is rendered hydrophobic. This helps to remove any salt or water from the pigment surface. The modified pigment will be easier to dry and be more reluctant to pick up water after drying. These features translate to a lower cost in pigment drying, and higher purity in the final product.

b. As the pigment preferably is modified while it is still in its non-agglomerated state, it is protected against secondary agglomeration during the drying process. The resultant pigment will be easier to disperse in non-polar vehicles, having greater compatibility with the vehicle systems, yielding smaller particle size in the dispersion, and hence giving rise to a more stable dispersion.

In addition, there are some added advantages specifically associated with the added hydrophobicity of the pigment particles:

1. The color of the pigment when used in a finished coating is enhanced.
2. The modified pigment is more resistant to moisture.
3. The modified pigment is more resistant to air-oxidation.
4. The modified pigment is more resistant to acids and bases.

Although the degree of hydrophobicity of a pigment is difficult to quantify, it can be inferred by the above properties imparted to the pigment.

EXAMPLE 1

A principal characteristic of the present process is its ability to produce drier pigments. This example comparatively evaluates the effectiveness of various surface derivatizing agents on iron oxide and two chrome yellow pigments.

A 20% pigment slurry was first prepared. A surface derivatizing agent was then added in an amount of 5% by weight of the pigment particles. Water was decanted (if possible), and the particles were filtered and allowed to air dry. Water content was evaluated by heating the pigment particles at 105° C. for 24 hours to drive off any bound water and measuring the weight loss during this process. The weight loss, which is the water content, is reported as a weight percentage of the pigment.

Table 1 lists the water content of pigment prepared by such a method. In most cases, there is less than 4% of water in the dried pigment. In comparison, control experiments utilizing unmodified iron oxide, the amount of water left behind in the unmodified iron oxide under similar experimental conditions is about 8–15% of the pigment's weight. Taking into consideration that the last 5% of water is usually the most difficult amount of water to remove, this process is shown to be quite efficient in removing the surface moisture.

TABLE 1

Effect of surface derivatizing agent on water removal

| Compound Tested | Pigment Used | Water Content (%) | Phase Separation Observed (Yes/No) |
| --- | --- | --- | --- |
| 2-hydroxyacetophenone | Black Iron Oxide | 0.5 | Yes |
| Nonylphenol | Black Iron Oxide | 0.7 | Yes |

TABLE 1-continued

Effect of surface derivatizing agent on water removal

| Compound Tested | Pigment Used | Water Content (%) | Phase Separation Observed (Yes/No) |
|---|---|---|---|
| Ethylacetoacetate | Black Iron Oxide | 3.5 | Yes |
| Ethyl Silicylate | Black Iron Oxide | 4.7 | Yes |
| Pentane-2,4-dione | Chrome Yellow | 1.4 | No |
| Pentane2,4-dione | Molybdate Orange | 3.5 | Yes, slowly |
| 1-Phenyl-2,4-pentanedione | Cobalt Blue | 1.6 | No |
| Hexamethyldisilazane | Zinc Oxide | 0.7 | Yes |

EXAMPLE 2

The method of Example 1 works well with transition metal oxides or complex pigments. However, for transition metals, contact angle measurement on metal films is a more direct means to evaluate the added hydrophobicity. Instead of using pigment, a metal film is used in the present Example. The metal surface was first cleaned with diluted nitric acid. A drop of water was then placed onto the metal surface. The contact angle of water, which is defined to be the angle between the tangent of a water droplet to the horizontal surface, was measured. If the surface is hydrophilic, the water drop will wet the surface and give rise to a small contact angle. If the surface becomes hydrophobic, the water droplet will remain as a drop and give rise to a larger contact angle.

A bronze plate, which is made of copper-zinc alloy, was used as the substrate. Before treatment, the contact angle of water was found to be 36°. However, after submerging this plate into a solution of 1% 2-hydroxyacetophenone in water (w/w) for 10 minutes, the contact angle increased to 80.5°. The large increase in contact angle clearly indicated the conversion of a hydrophilic surface to a hydrophobic one by such surface modification.

EXAMPLE 3

To demonstrate the ease of dispersibility imparted to pigment particles by the present process, two surface modified pigments—iron oxide and milori blue—were allowed to mix with a non-polar vehicle to form a paste and were subjected to a fineness of grind test (ASTM D1316-93) using a NPIRI grindometer. This test is a measure of the size and prevalence of oversize particles in a dispersion. This test utilizes a grind gage having two precision machined grooves each 1 in. (25.4 mm) wide and with a 0–1 mil (0–25 μm) taper. The test specimen is drawn down the paths slowly. The drawdowns are examined for the scale readings at which four and ten scratches appear and at which a preponderance of speckles (particles aggregates) disappear. The iron oxide and milori blue were previously modified by nonylphenol. The results were compared to that of their unmodified counterparts. A zero scratch, zero speckles (signs of pigment agglomerates) reading signifies a homogenous and stable dispersion of such pigment into the vehicle system. The ease of dispersion is measured by the number of 3-roller mill passes to which the mixture had to be subjected to achieve a zero scratch, zero speckles reading.

Table 2 depicts the comparison. From the table, it can be observed that the surface of the iron oxide was so hydrophobic as to require no milling to achieve a good dispersion. Though one mill pass was still needed to achieve such zero scratch, zero speckles reading in the case of milori blue, the surface modified milori blue was significantly more efficient to process than the unmodified counterpart.

TABLE 2

Effect of surface modification on ease of dispersion of the pigment (Note 1)

| | No. of 3 roller mill pass(es) to achieve 0.0 reading | |
|---|---|---|
| Pigment used | Unmodified | Modified |
| Iron Oxide | 1 | 0 |
| Milori Blue | 3–4 | 1 |

Note: 1. The varnish used is LV-1830 (Lawter Varnish Company, Northbrook, Chicago) or NVFG-380 (Walsh Company, Newark, NJ)

Note:

1. The varnish used is LV-1830 (Lawter Varnish Company, Northbrook, Chicago) or NVFG-380 (Walsh Company, Newark, N.J.)

EXAMPLE 4

The particle size and size distribution of a pigment in a dispersion also reveals how compatible the pigment is to the vehicle and the stability of the dispersion. Table 3 compares the mean particle size and size distribution of a nonylphenol modified milori blue pigment in a dispersion against an unmodified pigment. The results clearly indicate that the modified pigment possess smaller particle size when dispersed, and hence imparts greater stability in the dispersion. In fact, the dispersion of such in toluene is stable for months without significant settling.

Milori blue pigment was first modified in the aqueous phase. A 10% slurry of milori blue was prepared from the corresponding presscake by adding the appropriate amount of water. The pH was then adjusted to 6.6 by adding sodium bicarbonate. The solution was then heated and nonylphenol (5% by wt. of pigment) was then added. The solution was stirred at 65° C. for 10 minutes and was allowed to cool. No phase separation was seen. The whole mass was then filtered on a Buchner funnel using Whatman #1 filter paper. The residue was then washed and air-dried. The resulting dry pigment then was mixed with an equal weight of vanish like LV-1830 or NVFG-380. The resulting paste was dissolved in toluene and dispersed in the above solvent to produce the aforementioned results.

TABLE 3

Effect of surface modification on particle size and particle size distribution of a milori blue pigment dispersion in toluene (Note 1)

| | Unmodified Milori Blue | Modified Milori Blue |
|---|---|---|
| Mean Particle Size (Micron | 4.08 | 0.16 |
| Percentage of Particles Smaller than 0.3 Micron (%) | 0 | >98 |

Note: 1. Determined by a light scattering particle size analyzer (Horiba LA-900). The dispersion contains 5% pigment 5% LV-1830 and 90% toluene by weight. A refractive index of 1.54 was used for milori blue pigment.

Note: 1. Determined by a light scattering particle size analyzer (Horiba LA-900). The dispersion contains 5% pigment 5% LV-1830 and 90% toluene by weight. A refractive index of 1.54 was used for milori blue pigment.

EXAMPLE 5

Another feature of surface modification is color enhancement. This is mainly owing to an increase in compatibility between the pigment surface and the vehicle. Milori blue, and red and black iron oxides were modified using nonylphenol and used as a colorant in a heatset ink. The pigments were modified in the same manner as in Example 4.

The resultant color of the prints was evaluated using a color spectrometer, and compared to that of the unmodified counterpart. Table 4 contains the results of such experiments.

TABLE 4

Comparison of color of the prints using modified and unmodified iron oxide (Note 1)

|  | L | a | b |
|---|---|---|---|
| Unmod. Red Iron Oxide | 27.0 | 35.6 | 15.9 |
| Mod. Red Iron Oxide | 30.9 | 39.4 | 18.8 |
| Unmod. Black Iron Oxide | 25.4 | 0.8 | 2.1 |
| Mod Black Iron Oxide | 24.7 | 0.6 | 1.7 |
| Unmod. Milori Blue | 26.8 | -3.7 | -51.0 |
| Mod. Milori Blue | 20.4 | 1.7 | -51.2 |

Note: 1. A heat set ink was prepared using 17% of pigment and a heat set varnish. The samples were printed on coated paper using a little joe offset equipment. The color of the prints was evaluated using a Hunter Lab. Spectrometer.

Note:

1. A heat set ink was prepared using 17% of pigment and a heat set varnish. The samples were printed on coated paper using a little joe offset equipment. The color of the prints was evaluated using a Hunter Lab. Spectrometer.

The "L" value signifies the degree of blackness. A zero value of "L" means complete blackness. The "a" value signifies degree of redness. A high positive value of "a" indicates increasing redness. The "b" value is an indication of blueness. A high negative value of "b" indicates increasing blueness. For red and yellow colores, color improvement will be seen as an increase in "L" value and/or increase in "a" value. For black and blue-colored pigment, color improvement will be denoted by a decrease in "L" value and a more negative or smaller "b" value.

As shown in Table 4, all the modified pigments exhibit color enhancement as indicated by the greater value of "a" in modified red iron oxide, a lower value of "L" in modified black iron oxide, and a smaller "L" value and a more negative value of "b" in modified milori blue pigment. This again indicates the modification has furnished a better interface between the pigment and the varnish.

EXAMPLE 6

Another advantage of added hydrophobicity to a pigment is resistance to air-oxidation. This is particularly important in magnetic pigments like iron oxide.

As compared to the unmodified pigment, modified iron oxide exhibits higher heat stability, and hence color stability. Nonylphenol modified iron oxide can usually sustain a temperature as high as 105° C. for 5–7 hours before any significant change of color is observed. In comparison, unmodified iron oxide is completely oxidized and changed to a brownish color within 2–3 hours under the same condition.

EXAMPLE 7

Black iron oxide modified with dinonylphenol exhibited even greater stability towards heat and air when compared to unmodified black iron oxide. Black iron oxide was modified with dinonylphenol and remained black after one hour's exposure to an external temperature of 200° C., whereas the unmodified black iron oxide turned brownish after 10 minutes when exposed to the same conditions.

To quantify the oxidation process, thermogravimetric analysis (TGA) was used to analyze the samples. TGA monitors the weight gain of a material as a function of temperature. An air-oxidation involves incorporation of oxygen into the materials and hence an increase in weight, TGA will reveal useful parameters like onset temperature, degree oxidation and rate oxidation.

A 20% slurry of black iron oxide was prepared from the corresponding presscake by adding the appropriate amount of water. The solution was then heated and 5% (by weight of dry pigment) nonylphenol or dinonylphenol was then added. The solution was stirred at 65° C. for 10 minutes and was allowed to cool. Phase separation was seen. The supernatant was decanted. The remaining material was then filtered on a Buchner funnel using Whatman #1 filter paper. The residue was then washed and air-dried. The experiment was repeated using different amounts of nonylphenol to furnish iron oxide surface-modified at different levels.

The numerical data obtained from a TGA was tabulated in Table 5. Two observations can be made. First, the onset temperature, which is defined to be the temperature at which the weight starts to increase, differs for the two samples. The onset temperature of the modified iron oxide is about 40° C. higher than that of the unmodified one. Secondly, the degree of oxidation, which can be inferred from the percentage weight gain, is seen to be smaller for the modified iron oxide when compared to the unmodified one. Both observations suggest strongly that surface modification by nonylphenol does increase significantly the heat and oxidation stability of iron oxide.

Taking into account of the fact that only 1% (by wt.) of the nonylphenol was used in this case, surface modification by nonylphenol is effective, both cost-wise and performance-wise, in raising the stability of iron oxide.

TABLE 5

Onset Temperature and Weight Gain for unmodified and nonylphenol-modified magnetic iron oxide (1% modification)

|  | Unmodified Iron Oxide | Nonylphenol-modified Iron Oxide |
|---|---|---|
| Onset Temperature (Deg. C.) | 110 | 150 |
| Weight gain in Oxidation (wt %) | 1.40 | 0.99 |

EXAMPLE 8

The TGA experiment was also repeated for iron oxides bearing different degrees of surface modification to see if there is a correlation between the degree of modification and heat stability. The iron oxide was modified with 1%, 3% and 5% (by weight) of the agent and compared to the unmodified pigment.

The black iron oxide was modified in the same manner as for Example 7.

Table 6 depicts the results. As shown in Table 6, an increase in the degree of surface modification increases the onset temperature of oxidation process, and reduces the mass gain during this process. However, the effect of surface modification is observed to level off at about 3% modification.

TABLE 6

Effect of degree of surface modification on onset temperature of oxidation and the mass gain during the process

| Degree of Modification (% wt) | Onset Temperature (Deg. C.) | Mass Gain (WT %) |
| --- | --- | --- |
| 0 | 116 | 1.70 |
| 1 | 164 | 1.31 |
| 3 | 186 | 1.10 |
| 5 | 187 | 0.84 |

EXAMPLE 9

Milori blue pigment was used to demonstrate the increase in the resistance to acids or bases. Two experiments were performed to evaluate this property. First, the pigment was mixed and shaken with the solutions of interest. The mixture was then set aside and the color of the supernatant was observed. Coloration of the supernatant was an indication of instability towards that environment. The experiment was performed at room temperature. The second experiment was similar to the first one. Instead of using pigment alone, the pigment was mixed with a non-polar varnish and made into an ink. The ink was stirred with the solutions of interest and the color of the aqueous supernatant was noted.

Table 7 depicts the results of such stability testing. Nonylphenol-modified milori blue was found to be stable in all media for five days, and showed only slight decomposition after this period. The pigment was modified in the same manner as in Example 4.

By comparison, the unmodified milori blue pigment "dissolved" into almost all of the media, showing almost no resistance to such environments. The situation did not improve even when the pigment was turned into a finished ink. Bleeding still occurred for inks made up from the unmodified milori blue pigment.

TABLE 7

Stability of Modified and Unmodified Milori Blue pigment in different media

| Medium Used | Unmod. Milori Blue | Modified Milori Blue |
| --- | --- | --- |
| Buffer (pH 4.7) | Blue | Colorless |
| Buffer (pH 9.2) | Blue | Colorless |
| Buffer (pH 12.0) | Blue | Colorless (Note 1) |
| Soap Solution | Blue | Colorless |
|  | Finished Ink With Unmod. Pigmt. | Finished Ink with Mod. Pigmt. |
| Buffer (pH 5.0) | Blue (Note 2) | Colorless (Note 2) |

1. The supernatant turned slightly yellow after five days, indicating slight decomposition.
2. This observation is true for any non-polar vehicle system, irrespective of whether it is a heat-set or offset formula.

1. The supernatant turned slightly yellow after five days, indicating slight decomposition.
2. This observation is true for any non-polar vehicle system, irrespective of whether it is a heat-set or offset formula.

EXAMPLE 10

100 parts of a chrome yellow slurry (pigment content: 64.6) was mixed with 222 parts of water. To this mixture was added, with thorough stirring, 3.3 parts of 2,4-pentanedione. The mixture was then heated to 70° C. for 20 minutes. The solution was then allowed to cool, filter with a Buchner funnel and air-dry overnight. 64.6 parts of pigment were obtained and its water content was determined as described in Table 1.

EXAMPLE 11

A similar procedure to Example 10 was followed, except that 97 parts of a molybdate orange slurry, 195 parts of water and 2.9 parts of 2,4-pentanedione were used. In this case, phase separation occurred upon cooling the mixture and about 20 parts of supernatant were decanted off.

EXAMPLE 12

16 parts of a dry cobalt blue pigment were mixed with 141 parts of water to form a 10% aqueous slurry of the pigment; 0.8 part of 1-phenyl-2,4-pentanedione was added was vigorous stirring. The mixture was heated to 65° C. for 10 minutes. It was then cooled to room temperature, filtered using a Buchner funnel, and the pigment allowed to air-dry overnight. The water content of the resulting pigment was evaluated as described in Table 2.

EXAMPLE 13

20 parts of dry zinc oxide powder was mixed with 180 parts of water to form a 10% slurry. 1 part of hexamethyl-disilazane was added with high-shear mixing. The mixture was then heated to 55°–60° C. for 0.5 hours. It was then cooled back to room temperature. Phase separation occurred and supernatant was decanted. The zinc oxide was collected as described in Examples 9–12.

EXAMPLE 14

A similar procedure (as in Examples 9–12) was followed to prepare red iron oxide except that 376 parts of a red iron oxide slurry and 2.7 parts of nonylphenol were used. Phase separation occurred upon cooling and 76 parts of water were decanted. The pigment was then filtered, washed, air-dried, and evaluated as shown in Table 5.

EXAMPLE 15

A 10% slurry of milori blue (prepared from presscake) was placed into contact, with vigorous mixing, with 6% of a previously prepared mixture of soy lecithin and nonylphenol (50/50, w/w). After being so contacted, the pigment was then filtered, washed and dried in a convection oven set at 70° C. Two grams of such pigment was mixed with three grams of NVFG-380 (Lawter International, Northbrook, Ill.) and the mixture was passed through fifty revolutions on a Hoover-Muller grinder. The resulting ink concentrate was mixed with a heatset varnish to produce a heatset ink for test printing. As a control, an ink concentrate was also produced using milori blue pigment modified only with nonylphenol. The printed samples were subjected to calorimetric analysis using a Hunter Laboratory spectrometer. The results are shown in Table 8.

TABLE 8

Colorimetric analysis of printed samples using (1) milori blue pigment modified with nonylphenol alone, and (2) milori blue pigment modified with a mixture of nonylphenol and soy lecithin (Note 1)

| Colormetric Parameters | L | a | b |
| --- | --- | --- | --- |
| Nonylphenol Only | 19.60 | 3.15 | −52.84 |
| Nonylphenol plus soy lecithin | 23.65 | −0.34 | −53.13 |

Note: Pigment concentration = 17%.

Note: Pigment concentration=17%.

These results indicate that by applying a soy lecithin-nonylphenol mixture to the pigment surface, the shade of the prints using such a modified pigment can be shifted towards the desirable green side.

What is claimed is:

1. A method for hydrophobically modifying pigment particles selected from the group consisting of iron containing pigment particles, iron oxide containing pigment particles, and complexes of iron or iron oxides, said method comprising contacting an aqueous slurry of said pigment particles with a surface derivatizing agent which is a phenol substituted with one or more substituents selected from the group consisting of cycloalkyl, alkenyl, alkynyl, alkoxy, keto, diketo, pyrido, benzo, alkylcarbonyl, halo, cycloalkylcarbonyl, hydroxyalkyl, haloalkyl, alkoxyalkyl, and unsubstituted alkyl.

2. The method of claim 1, wherein the surface derivatizing agent is a phenol substituted with an unsubstituted alkyl group or an alkyl carbonyl group.

3. The method of claim 1, wherein said surface derivatizing agent is a phenol substituted with a substituent selected from the group consisting of alkenyl, alkynyl, alkoxy, keto, pyrido, benzo, alkylcarbonyl, halo, cycloalkylcarbonyl, hydroxyalkyl, haloalkyl, and alkoxyalkyl.

4. The method of claim 2, wherein said surface derivative agent is 2'-hydroxy acetophenone.

5. A method of preparing hydrophobically modified pigment particles, comprising:
   (a) preparing an aqueous slurry of pigment particles selected from the group consisting of iron containing pigment particles, iron oxide containing pigment particles, and complexes of iron or iron oxides, such that the pigment particles are present in an amount from about 1% to about 20% by weight of the slurry;
   (b) adjusting the pH of the slurry;
   (c) adding a surface derivatizing agent which is a phenol substituted with one or more substituents selected from the group consisting of cycloalkyl, alkenyl, alkynyl, alkoxy, keto, diketo, pyrido, benzo, alkyl carbonyl, halo, cycloalkyl carbonyl, hydroxy alkyl, haloalkyl, alkoxyalkyl, and unsubstituted alkyl to the slurry in an amount less than about 10% by weight of the pigment particles;
   (d) mixing the surface derivatizing agent into the slurry to obtain modified pigment particles; and
   (e) recovering and drying the modified pigment particles.

6. The method of claim 5, wherein said surface derivatizing agent is 2'-hydroxy acetophenone.

7. The method of claim 5, wherein the surface derivatizing agent is a phenol substituted with an unsubutituted alkyl group or alkyl carbonyl group.

8. The method of claim 5, wherein the aqueous slurry of pigment particles contains from about 2% to about 50% pigment particles by weight of the slurry.

9. The method of claim 8 wherein the surface derivatizing agent is added to the slurry in an amount less than about 5% by weight of the pigment particles.

10. The method of claimed 9, wherein the surface derivatizing agent is mixed into the slurry at a temperature from about 50° C. to about 70° C.

11. A method for preparing a pigment concentrate, comprising adding an organic vehicle to modified pigment particles prepared in accordance with claim 5.

12. The method of claim 11, wherein the organic vehicle is added in an amount sufficient to achieve a ratio of pigment particles to vehicle of about 1:0.8 or less by weight.

13. A method for preparing a pigment dispersion, comprising dispersing a concentrate prepared according to the method of claim 11 with one or more solvents selected from the group consisting of water, alcohol, aromatic solvents, aliphatic solvents, halogenated hydrocarbons, aromatic oils, aliphatic oils, glycol ethers, esters, and ketones.

14. The method of claim 13, wherein the concentrate is present in an amount sufficient to achieve a mean pigment particle size in the dispersion of less than or equal to about 0.7 micron.

15. A pigment dispersion comprising:
   (a) pigment particles selected from the group consisting of iron containing pigment particles, iron oxide containing pigment particles, and complexes of iron or iron oxides, which particles having been hydrophobically modified by a surface derivatizing agent which is a phenol substituted with one or more substituents selected from the group consisting of cycloalkyl, alkenyl, alkynyl, alkoxy, keto, diketo, pyrido, benzo, alkyl carbonyl, halo, cycloalkyl carbonyl, hydroxy alkyl, haloalkyl, alkoxy alkyl, and unsubstituted alkyl;
   (b) an organic vehicle; and
   (c) one or more solvents, selected from the group consisting of water, alcohol, aromatic solvents, aliphatic solvents, halogenated hydrocarbons, aromatic oils, aliphatic oils, glycol ethers, esters, and ketones.

16. The method of claim 15, wherein the surface derivatizing agent is a phenol substituted with an unsubstituted alkyl group or alkyl carbonyl group.

17. The pigment dispersion of claim 15, wherein said surface derivatizing agent is 2-hydroxy acetophenone.

18. A method for hydrophobically modifying pigment particles selected from the group consisting of transition metal containing pigment particles, transition metal oxide containing pigment particles, and complexes of transition metals or transition metal oxides, said method comprising contacting an aqueous slurry of said pigment particles having a pH of from about 6 to about 7 with a surface derivatizing agent that is a trimethylsilyl donor.

19. The method of claim 18 wherein the trimethylsilyl donor is selected from the group consisting of hexamethyldisilane, hexamethyldisilazane, bis-N,O-trimethylsilylacetamide, trimethylchlorosilane, trimethylethoxysilane, 2-trimethylsiloxypent-2-en4-one, trimethylsilyldimethylamine, and trimethylsilylimidazole.

20. The method of claim 18, wherein the surface derivatizing agent is added in an amount less than about 10% by weight of the pigment particles.

21. A method of preparing modified pigment particles, comprising:
   (a) preparing an aqueous slurry of pigment particles selected from the group consisting of transition metal containing pigment particles, transition metal oxide containing pigment particles, and complexes of transition metals or transition metal oxides, such that the pigment particles are present in an amount from about 1% to about 20% by weight of the slurry;
   (b) adjusting the pH of the slurry to a pH of from about 6 to about 7;
   (c) adding a surface derivatizing agent that is a trimethylsilyl donor to the slurry in an amount less than about 10% by weight of the pigment particles;
   (d) mixing the surface derivatizing agent into the slurry to obtain modified pigment particles; and
   (e) recovering and drying the modified pigment particles.

22. A modified pigment particle prepared by the method of claim 21.

23. The method of claim 21 wherein the trimethylsilyl donor is selected from the group consisting of hexamethyldisilane, hexamethyldisilazane, bis-N,O-trimethylsilylacetamide, trimethylchlorosilane, trimethylethoxysilane, 2-trimethylsiloxypent-2-en4-one, trimethylsilyldimethylamine, and trimethylsilylimidazole.

24. The method of claim 21, where the aqueous slurry of pigment particles contains from about 8% to about 12% pigment particles by weight of the slurry.

25. The method of claim 24, where the surface derivatizing agent is added to the slurry in an amount less than about 5% by weight of the pigment particles.

26. The method of claim 25, where the surface derivatizing agent is mixed into the slurry at a temperature from about 50° C. to about 70° C.

27. A method for preparing a pigment concentrate, comprising adding an organic vehicle to modified pigment particles prepared in accordance with claim 21.

28. The method of claim 27, wherein the organic vehicle is added in an amount sufficient to achieve a ratio of pigment particles to vehicle of about 1:0.8 or less by weight.

29. A method for preparing a pigment dispersion, comprising dispersing a concentrate prepared according to the method of claim 27 with one or more solvents selected from the group consisting of water, alcohol, aromatic solvents, aliphatic solvents, halogenated hydrocarbons, aromatic oils, aliphatic oils, glycol ethers, esters, and ketones.

30. The method of claim 29, wherein the concentrate is present in an amount sufficient to achieve a mean pigment particle size in the dispersion of less than or equal to 0.3 microns.

31. A pigment dispersion comprising:
  (a) pigment particles selected from the group consisting of transition metal containing pigment particles, transition metal oxide containing pigment particles, and complexes of transition metal or transition metal oxides,
  (b) a surface derivatizing agent that is a trimethylsilyl donor selected from the group consisting of hexamethyldisilazane, bis-N,O-trimethylsilylacetamide, trimethylsilyldimethylamine, and trimethylsilylimidazole;
  (c) an organic vehicle; and
  (d) one or more solvents, selected from the group consisting of water, alcohol, aromatic solvents, aliphatic solvents, halogenated hydrocarbons, aromatic oils, aliphatic oils, glycol ethers, esters, and ketones.

32. The pigment dispersion of claim 31, wherein the trimethylsilyl donor is selected from the group consisting of bis-N,O-trimethylsilylacetamide, trimethylsilyidimethylamine, and trimethylsilylimidazole.

33. The pigment dispersion of claim 31, wherein the surface derivatizing agent is added in an amount less than about 10% by weight of the pigment particles.

34. A derivatizing composition comprising from about 1 percent to about 50 percent lecithin and from about 99 percent to about 50 percent (4-nonyl) phenol or (2,4-dinonyl) phenol wherein said composition modifies the surface of pigment particles.

35. The derivatizing composition of claim 34, wherein said composition hydrophobically modifies the surface of the pigment particles.

* * * * *